(12) United States Patent
Siraj et al.

(10) Patent No.: US 11,758,470 B2
(45) Date of Patent: Sep. 12, 2023

(54) SYSTEMS AND METHODS FOR ENHANCING MESH OVER WI-FI 6E

(71) Applicant: HEWLETT PACKARD ENTERPRISE DEVELOPMENT LP, Houston, TX (US)

(72) Inventors: Mohd Shahnawaz Siraj, Santa Clara, CA (US); Qiang Zhou, Santa Clara, CA (US); Andre Beaudin, St. Laurent (CA)

(73) Assignee: Hewlett Packard Enterprise Development LP, Spring, TX (US)

( * ) Notice: Subject to any disclaimer, the term of this patent is extended or adjusted under 35 U.S.C. 154(b) by 326 days.

(21) Appl. No.: 17/227,109

(22) Filed: Apr. 9, 2021

(65) Prior Publication Data

US 2022/0330136 A1  Oct. 13, 2022

(51) Int. Cl.
*H04W 48/10* (2009.01)
*H04W 84/18* (2009.01)

(52) U.S. Cl.
CPC ............ *H04W 48/10* (2013.01); *H04W 84/18* (2013.01)

(58) Field of Classification Search
CPC .................. H04W 48/08–20; H04W 84/18
See application file for complete search history.

(56) References Cited

U.S. PATENT DOCUMENTS

| 2016/0007275 | A1 | 1/2016 | Park et al. |
| 2017/0048785 | A1 | 2/2017 | Ge et al. |
| 2019/0124706 | A1 | 4/2019 | Huang et al. |
| 2019/0297632 | A1 | 9/2019 | Huang et al. |

OTHER PUBLICATIONS

IEEE Standard Part 11: Wireless LAN Medium Access Control (MAC) and Physical Layer (PHY) Specifications—Redline, in IEEE Std 802.11-2020 (Revision of IEEE Std 802.11-2016)—Redline, vol., No., pp. 1-7524, Feb. 26, 2021, hereinafter the "802.11 standard". (Year: 2021).*

IEEE Standard Part 11: Enhancements for High-Efficiency WLAN, in IEEE Std 802.11ax-2021 (Amendment to IEEE Std 802.11-2020), vol., No., pp. 1-767, May 19, 2021, doi: 10.1109/IEEESTD.2021.9442429., hereinafter the "802.11ax standard". (Year: 2021).*

Sankhe, K. et al., CSIscan: Learning CSI for Efficient Access Point Discovery in Dense WiFi Networks, 2020 IEEE 28th International Conference on Network Protocols (ICNP), Oct. 13-16, 2020, 5 pgs., IEEE, Madrid, Spain.

\* cited by examiner

*Primary Examiner* — Ronald Eisner
(74) *Attorney, Agent, or Firm* — Sheppard Mullin Richter & Hampton LLP

(57) ABSTRACT

Systems and methods are provided for multiple basic service set identifier (MBSSID) beaconing (from an access point (AP) standpoint) and MBSSID/virtual AP (VAP) scanning (from a client device perspective). To facilitate easier discovery of mesh APs/VAPs, BSSIDs associated with mesh VAPs can be advertised more frequently, e.g., being broadcast as a transmitted or non-transmitted BSSID in each MBSSID beacon. Additionally, information regarding mesh VAPs, such as mesh capability information, can be provided via intermediate discovery beacons or frames such that out-of-band scanning mechanisms can discover mesh VAPs faster. Additionally still, the existence of mesh VAPs can be advertised in a dedicated field of an MBSSID beacon.

8 Claims, 12 Drawing Sheets

| PSC (20MHz) 400s | Non-PSC (20MHz) 402a | Non-PSC (20MHz) 402b | Non-PSC (20MHz) 402c | PSC (20MHz) 400b | Non-PSC (20MHz) 402d | Non-PSC (20MHz) 402e |

FIG. 4

SYSTEMS AND METHODS FOR ENHANCING MESH OVER WI-FI 6E

DESCRIPTION OF RELATED ART

Wi-Fi® 6, another name for the 802.11ax standard, refers to a next-generation Wi-Fi standard that uses technologies such as Multi-User Multiple Input Multiple Output (MU-MIMO) and Orthogonal Frequency Division Multiple Access (OFDMA) to provide increased capacity, and the ability to handle more network devices. Wi-Fi 6E (the "E" standing for "Extended") extends the number of usable wireless bands. In particular, Wi-Fi 6E adds up to 1200 MHz of additional spectrum in the 6 GHz band (ranging from 5.925 GH to 7.125 GHz), in addition to the already-used 2.4 GHz and 5 GHz bands. Unlike the existing (2.4 GHz and 5 GHz) bands on which channels are currently crammed into the limited spectrum, the 6 GHz band exists without overlap or interference. Access to the 6 GHz frequency brings more bandwidth, faster speeds, and lower latency, opening up resources for future innovations like AR/VR, and 8 K streaming.

The addition of the 1200 MHz of new spectrum can drastically increase network capacity while reducing congestion. A clear 6 GHz spectrum delivers significant reductions in latency as well. These advantages make Wi-Fi 6E technology a good candidate for backhaul links over Wi-Fi mesh. For example, the 6 GHz band can be used to create an extremely fast mesh backhaul network by freeing, e.g., the 5 GHz band from backhauling duties, thus being available to serve just client devices, also referred to as stations (STAB).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4 illustrates an example 20 MHz channel set in the 6 GHz band.

Figure 1A:
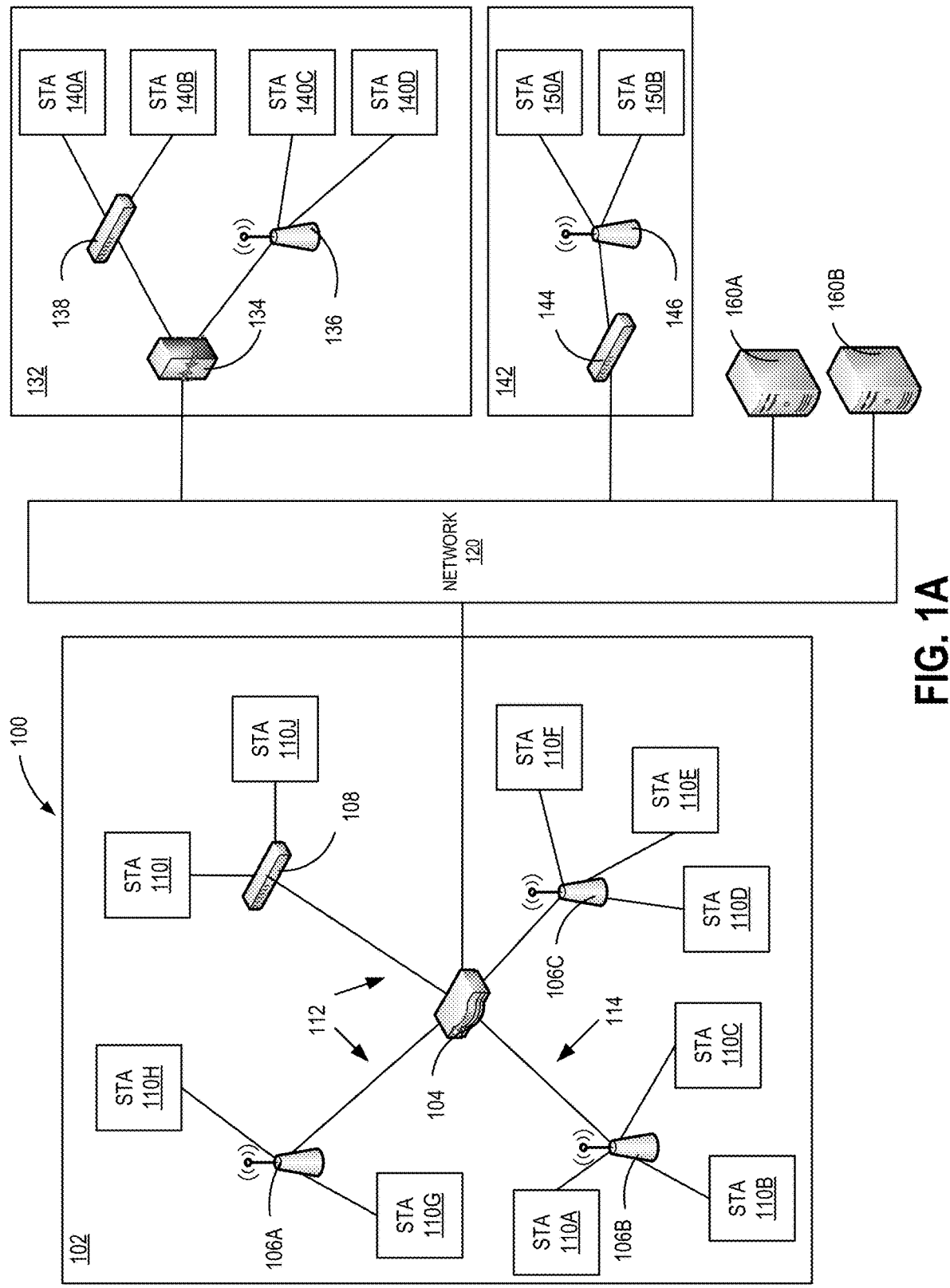
FIG. 1A illustrates an example wireless network deployment in which transmissions using multi-station-associated frames can be utilized in accordance with various embodiments.

The figures are not exhaustive and do not limit the present disclosure to the precise form disclosed.

DETAILED DESCRIPTION

An access point (AP) generally refers to a networking device that allows a STA to connect to a wired or wireless network. In accordance with the Institute of Electrical and Electronics Engineers (IEEE) 802.11 WLAN standards (which includes Wi-Fi), a service set is term used to refer to a group of wireless network devices which share a service set identifier (SSID)—typically the natural language label that users see as a network name. A service set forms a logical network of nodes operating with shared link-layer networking parameters. One type of service set, a basic service set (BSS) can refer to a subgroup, within a service set, of devices that share physical-layer medium access characteristics (e.g., radio frequency, modulation scheme, security settings) such that they are wirelessly networked. The BSS is defined by a BSS identifier (BSSID) shared by all devices within it.

APs may advertise WLANs to STAs by sending out beacons and probe responses that contain a WLAN's SSID, as well as, e.g., supported authentication and data rates. When a STA associates to an AP, that STA sends traffic to the AP's BSSID, which typically is the AP's Media Access Control (MAC) address. In some networks, an AP may use a unique BSSID for each WLAN allowing a single, physical AP to support multiple WLANs. A WLAN configuration applied to a BSSID of an AP can be referred to as a virtual AP (VAP). In other words, a VAP may be thought of as a logical or a virtual AP instance on a physical AP. VAPs or VAP profiles can be configured to provide different network access or services to users on/across the same physical network. For example, a first WLAN may be configured to provide access to guest users and a second WLAN can be configured to provide access to employee users through the same AP(s). Each of the first and second WLAN configurations applied to different BSSIDs result in first and second VAPs. For example, a VAP can be configured to offer open authentication and Captive Portal access with basic rates of 1 and 2 Mbps, while another VAP can be configured to require WPA authentication with basic rates of up to 11 Mbps.

In the Wi-Fi 6 standard, a BSSID optimization mechanism was introduced, i.e., multiple BSSID (MBSSID). With MBSSID, VAP information associated with each of a plurality VAPs/BSSIDs can be combined/aggregated into a single beacon to advertise each of the VAPs without the need to send separate beacons for each VAP. This MBSSID mechanism remains in Wi-Fi 6E, but the standard does not account for mesh links. For example, there is no mechanism specified in the Wi-Fi 6 standard regarding how mesh VAPs should be configured, specifically on a 6 GHz radio of an AP. In Wi-Fi 6, the use of MBSSID was optional, but in Wi-Fi 6E, MBSSID is mandatory per the Wi-Fi 6 standard for operating in the 6 GHz, and STAs are not allowed to send broadcast probe requests to an AP in the 6 GHz band.

Accordingly, various embodiments are directed to MBSSID beaconing (from an AP standpoint) and MBSSID/VAP scanning (from a STA perspective). To facilitate easier discovery of mesh APs/VAPs, four mechanisms are disclosed, which can be used independently, or in conjunction with one another. In accordance with some embodiments, BSSIDs associated with mesh VAPs can be advertised more frequently. In accordance with some embodiments, information regarding mesh VAPs can be provided using out-of-band scanning mechanisms for faster discovery (by STAs) of mesh VAPs.

Before describing embodiments of the disclosed systems and methods in detail, it is useful to describe an example network installation with which these systems and methods might be implemented in various applications. FIG. 1A illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106A-C. Switches 108 and wireless APs 106A-C provide network connectivity to various client devices/STAs 110A-J. Using a connection to a switch 108 or AP 106A-C, a STA 110A-J may access network resources, including other devices on the (primary site 102) network and the network 120.

As used herein, a client device or STA refers to a device including a processor, memory, and I/O interfaces for wired and/or wireless communication. Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STA 110I-J. STAs 110I-J may connect to the switch 108 and through the switch 108, may be able to access other devices within the network configuration 100. STAs 110I-J may also be able to access the network 120, through the switch 108. The STAs 110I-J may communicate with the switch 108 over a wired 112 connection. In the illustrated example, the switch 108 communicates with the controller 104 over a wired 112 connection, though this connection may also be wireless.

Wireless APs 106A-C are included as another example of a point of access to the network established in primary site 102 for STAs 110A-H. Each of APs 106A-C may be a combination of hardware, software, and/or firmware that is configured to provide wireless network connectivity to wireless STAs 110A-H. In the illustrated example, APs 106A-C can be managed and configured by the controller 104. APs 106A-C communicate with the controller 104 and the network over connections 112, which may be either wired or wireless interfaces.

The network 120 may be a public or private network, such as the Internet, or other communication network to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

An AP generally refers to a networking device that allows a client device or STA to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

As alluded to above, APs, such as APs 106A-C, AP 136, and AP 146 are enabled to implement VAPs, namely, support for one or more multiple distinct SSID values over a single AP radio with unique media access control (MAC) addresses per SSID (i.e., BSSID). As is known, an SSID is a field between 0 and 32 octets that may be included as an Information Element (IE) within management frames. In the context of the 802.11 standard, management frames supporting the SSID IE include the beacon, probe request/ response, and association/reassociation request frames. In one embodiment, an AP supports VAPs using multiple BSSIDs. Typically, a beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. Typically, an AP may advertise up to a given number (e.g., 16) of beacons, each with a different BSSID to provide the VAP support. Each VAP may have a unique MAC address, and each beacon may have a network name. However, with the advent of MBSSID, multiple BSSIDs may be aggregated into an MBSSID beacon (described in greater detail below).

Figure 1B:
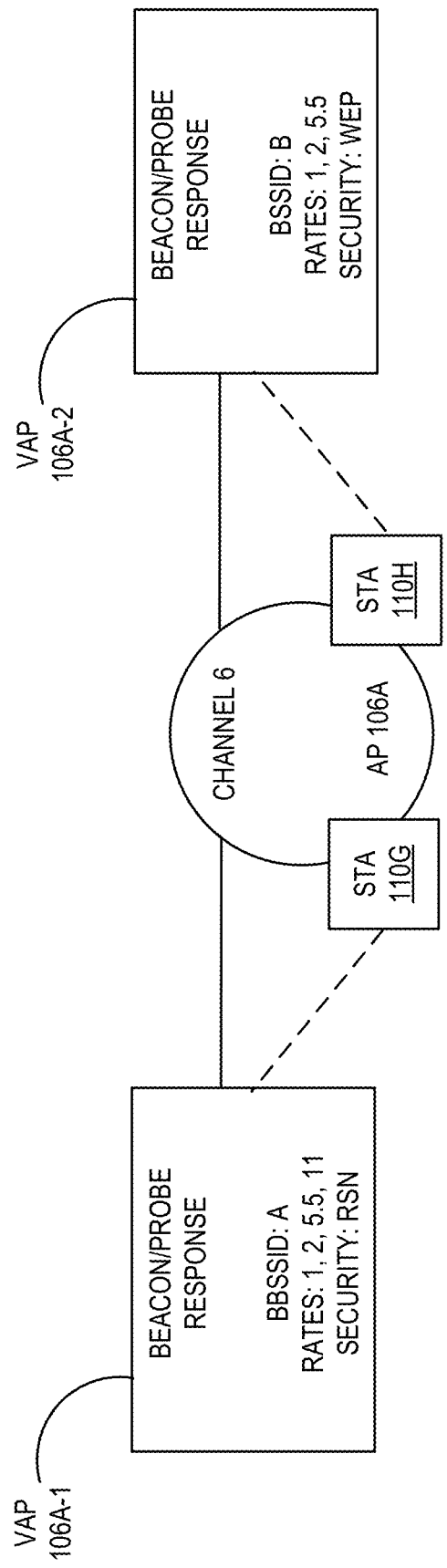
FIG. 1B illustrates an example multi-virtual access point configuration across which transmissions using multi-station-associated frames can be utilized in accordance with various embodiments.

FIG. 1B is a schematic representation of an multi-VAP configured AP. AP 106A may be configured to support multiple VAPs 106A-1 and 106A-2. Each VAP 106A-1 and 106A-2 emulates the operation of physical AP 106A at the MAC layer. In particular, each VAP 106A-1 and 106A-2 emulates the MAC layer behavior of the physical AP 106A by operating with a distinct BSSID (A, B) and, optionally, distinct capability advertisements (e.g., rates 1, 2, 5.5, 11 for BSSID A, and rates 1, 2, 5.5 for BSSID B), and default key sets (RSN for BSSID A and WEP for BSSID B). Each VAP 106A-1 and 106A-2 may also exhibit distinct application behavior (at the application layer), and be reachable via a distinct domain name (at the IP layer). To provide this support, it is assumed that STAs 110G and 110H can discover the SSIDs, that each VAP 106A-1 and 106A-2 can advertise its own set of capabilities, and that each VAP 106A-1 and 106A-2 can be allocated to a unique WLAN. It should be understood that the number of VAPs can differ, and the example of FIG. 1B is not meant to be limiting.

As noted above, an AP may advertise up to a given number (e.g., 16) of beacons, each with a different BSSID to provide VAP support. Each beacon is typically approximately 300 bytes and 200 bytes for a transmitted BSSID and non-transmitted BSSID, respectively (discussed in greater detail below). In order to transmit information about 16 different VAPs in a single beacon, that beacon would grow to 4800 bytes. However, certain chipsets/chipset vendors limit beacon size to, e.g., approximately 1500 bytes. Thus, a single beacon may not be able to accommodate information associated with 16 different VAPs, which case, MBSSID beacons may be split. That is, in the event information regarding 16 VAPs (or some number of VAPs that if combined, would exceed the beacon size limit/threshold) is to be combined in a single MBSSID beacon, the VAP information regarding the 16 VAPs can still be aggregated into a single beacon. However, that beacon is split into conforming sizes. For example, information regarding six VAPs can be transmitted in a first MBSSID beacon, information regarding another six VAPs can be transmitted in a second MBSSID beacon, and information regarding the remaining four VAPs can be transmitted in a third MBSSID beacon.

In an MBSSID beacon, the VAP/BSSID that actually transmits the MBSSID beacon is referred to as the "transmitted BSSID." In other words, the transmitted BSSID is the BSSID that handles transmitting the MBSSID beacon(s) on behalf of the other VAPs/BSSIDs and itself, i.e., any BSS of a multi-BSS AP that supports MBSSID functionality, and transmits management frames with an MBSSID element (MBE). In contrast, a "non-transmitted BSSID" refers to any BSS of a multi-BSS AP that supports MBSSID functionality, but does not explicitly transmit management frames with an MBE. Nevertheless, the MBE of such non-transmitted BSSIDs may be derived from information encoded in a probe response, MBSSID beacon, and neighbor reports. Accordingly, the MBSSID capability enables the advertisement of information for BSSIDs using a single beacon (or probe response frame) instead of multiple beacon and probe response frames. MBSSID also enables the indication of buffered frames for multiple BSSIDs using a single Traffic Indication Map (TIM) element in a single MBSSID beacon.

Figure 2:
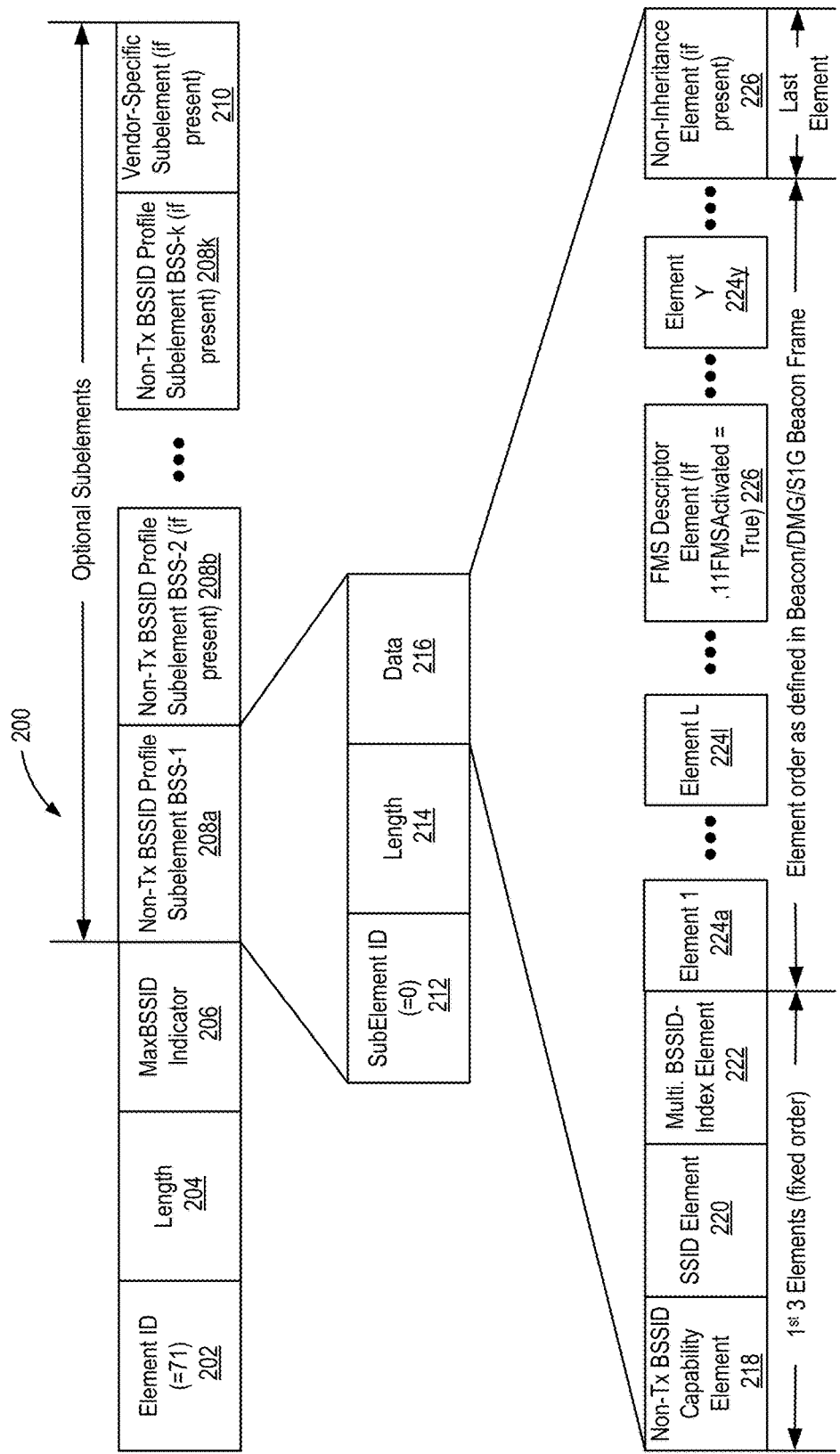
FIG. 2 illustrates an example MBSSID beacon element.

FIG. 2 illustrates an example of an MBSSID element 200 carrying non-transmitted BSSID profile sub-elements. MBSSID element 200 may comprise the following: an element ID 202; a length IE 204, a MaxBSSID indicator 206; one or more optional non-transmitted BSSID profile sub-elements 208a-208k (if present, i.e., if the AP is a multi-BSS/VAP AP), and a vendor-specific sub-element 210. A non-transmitted BSSID profile sub-element regarding a BSS, in this example BSS-1, may comprise a sub-element ID 212, a length 214, and the data 216. The data 216 IE comprises: a non-transmitted BSSID capability element 218; an SSID element 220; a multiple BSSID index element 222; elements 1 . . . L . . . Y (224a . . . 224l . . . 224y; a Flexible Multicast Service (FMS) element 226; and if present, a non-inheritance element 226. The first three elements 218-222 are fixed in the illustrated order, whereas an order of the elements 224a-224y and the FMS descriptor element 226 can be defined in a beacon/Directional Multi Gigabit (DMG)/Sub-1 GHz (S1G) beacon frame.

As part of the MBSSID functionality, the Wi-Fi 6 standard provides a Fast Initial Link Setup (FILS) discovery beacon or frame. FILS beacons/frames can be broadcast by an AP to allow STAs to more quickly discover an AP with which to associate. FILS beacons/frames can be thought of as "mini beacons" that provide basic information regarding a BSS, including its BSSID, a hash of the SSID (Short SSID), and the time a next "full" beacon frame is to be broadcast. It should be understood that FILS beacons (and unsolicited broadcast probe responses, described below) from an AP are typically broadcast every 20 ms, while "full" beacons are typically transmitted every 100 ms. That is, information about a 6 GHz AP can be broadcast in FILS beacons. If a reported 6 GHz AP is part of a multiple BSSID set, then the BSSID and short SSID of a co-located 6 GHz AP shall be indicated in the BSSID field and Short SSID field in a Reduced Neighbor Report (RNR) element. The RNR element can indicate whether the reported 6 GHz AP corresponds to a transmitted BSSID or a non-transmitted BSSID. Typically, in response to a FILS beacon, a STA may send a probe request to the identified BSS. In turn, the AP corresponding to the BSS can broadcast a probe response. The probe response is broadcast to allow any other STAs that may be listening to receive the probe response, thereby avoiding retransmission overhead. In some scenarios, an unsolicited broadcast probe response can be sent instead of a FILS beacon.

Figure 3:
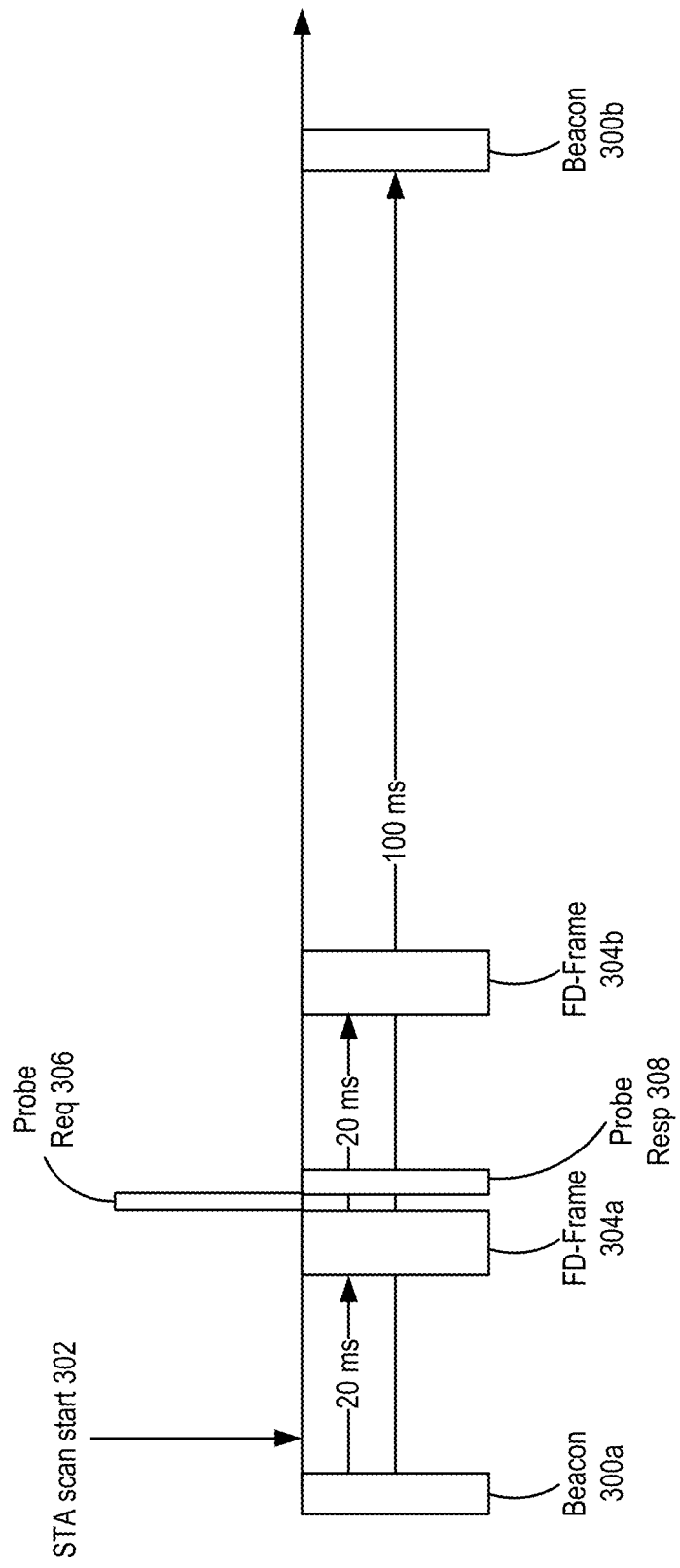
FIG. 3 illustrates an example in-band discovery scenario and related operations.

FIG. 3 illustrates a mandatory (per the 802.11 standard) in-band discovery process when an AP is operating on a channel in the 6 GHz band. As alluded to above, a typical "full" beacon 300a may be sent. Every 20 ms, a FILS discovery (FD) beacon 304a can be broadcast. As noted above, a FILS beacon can include an RNR element that can comprise information such as BSSID and short SSID information. In response to the FILS discovery beacon 304a, a STA that may have started scanning for APs (at 302) subsequent to beacon 300a being sent (meaning the STA missed the initial beacon 300a) can respond to the FILS discovery beacon 304a with a probe request 306. In response, the AP may broadcast a probe response 308 that contains other information that facilitates access/association to the broadcasting AP.

As illustrated in FIG. 3, and as described above, full beacons are typically sent every 100 ms. Here, without the FILS discovery beacon, the STA would have had wait 100 ms for the next full beacon 308*b* before being able to discover the 6 GHz AP. However, due to the broadcasting of FILS discovery beacon 304*a*, the STA can get quicker access than if it would have had to wait until the broadcasting of beacon 308*b*. Another FILS discovery beacon/frame 304*b* may be sent 20 ms after FILS discovery beacon 304*a* is sent. Again, a STA scanning for an AP before transmission of the full beacon 304 can potentially gain access more quickly than if it had to wait the full 100 ms until beacon 300*b* is sent.

The above-described in-band scanning mechanism enables fast and spectrally efficient discovery of APs in the 6 GHz band using passive and/or (limited) active scanning. Meanwhile, the airtime overhead caused by discovery signaling is minimized by mandatory use of MBSSID capability. This improves throughput, latency and jitter KPIs in the 6 GHz band since more airtime is available for data, and channel access delays caused by active scan signaling are minimized.

FIG. 4 illustrates an example set of 20 MHz channels in the 6 GHz band, with a center channel frequency represented as follows, ch_a=channel starting frequency−55+80×n (MHz), are referred to as preferred scanning channels (PSCs, i.e., PSCs 400*a*, 400*b*), with non-PSCs 402*a*-402 occurring between PSCs 400*a*, 400*b* and non-PSCs 402*d*-402*e* coming after PSC 400*b*. A 6 GH STA will only scan PSC channels unless channel information of a 6G AP is indicated vis-a-vis other methods like in an RNR IE.

To aid STAs in scanning channels in the 6 GHz band, the IEEE 802.11ax standard allows for an out-of-band discovery mechanism using an AP which has both 6 GHz and non-6 GHz (e.g., 2.4 GHz or 5 GHz) radios, referred to as collocated radios. That is, an AP can use a non-6 GHz radio to advertise the availability of a collocated 6 GHz radio to such client devices. In particular, this advertising of collocated 6 GHz radios by a non-6 GHz radio can be performed by allowing an AP to advertise an RNR IE in its beacons, as well as probe responses to the RNR IE-populated beacons on the non-6 GHz radio (described above). STAs that are capable of operating in the 6 GHz band can parse this RNR IE, and switch directly to the 6 GHz channel being advertised in the RNR IE, and connect directly to the corresponding SSID of the radio operating on that channel instead of spending time scanning the 6 GHz channels. This is intended to save client devices from experiencing an expectedly high scanning duration due to the number of channels present in the band, e.g., client devices scanning each and every 6 GHz channel one-by-one.

Figure 5:
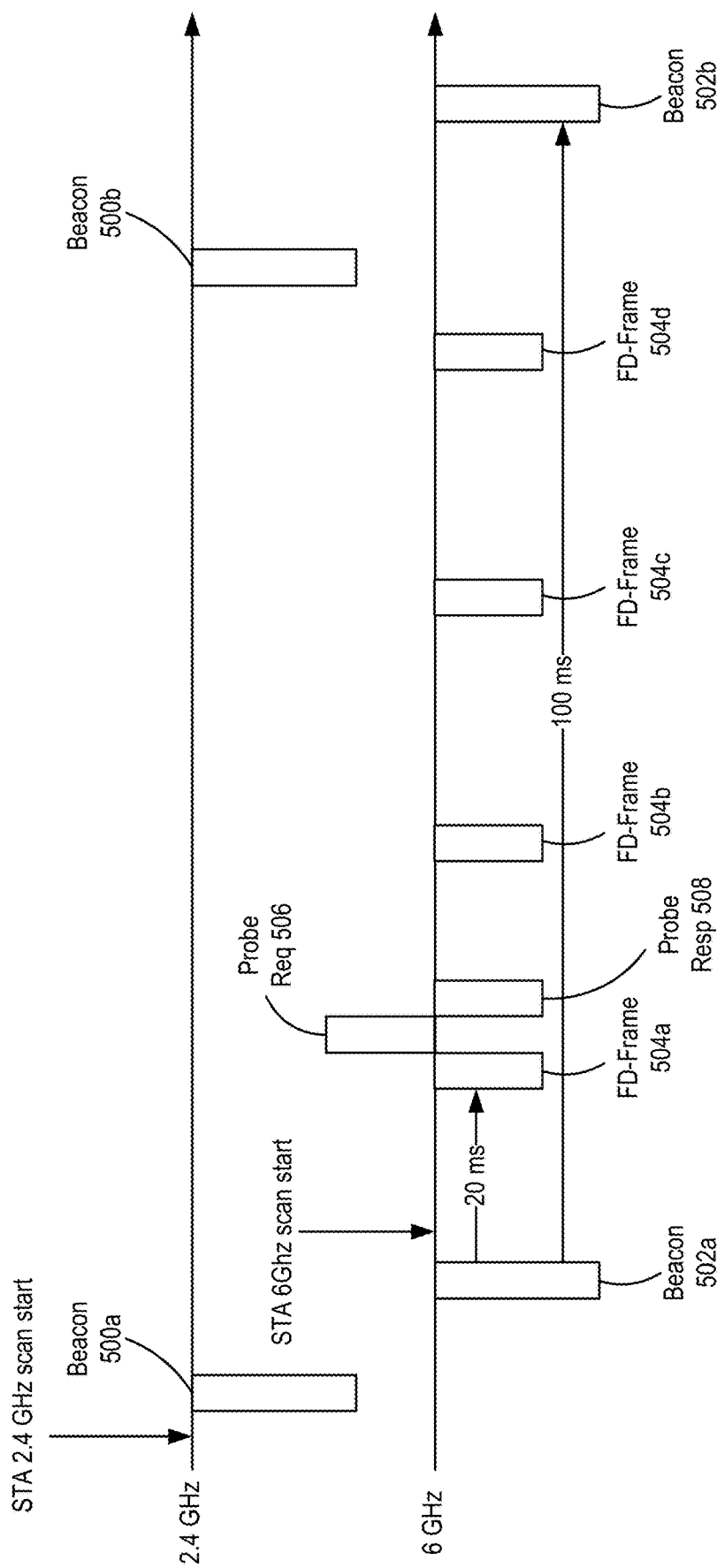
FIG. 5 illustrates an example out-of-band discovery scenario.

FIG. 5 illustrates an out-of-band discovery scenario, where a radio operating in the 2.4 GHz band is co-located with one or more radios operating in the 6 GHz band. As discussed above, a non-6 Ghz radio co-located with a 6 GHz radio can advertise the 6 GHz radio on its behalf. by including an RNR element in the beacons 500*a*/500*b* sent by the 2.4 GHz radio (and in probe response frames it broadcasts). The RNR element contains information, such as an AP's operating channel number, operating class, Target Beacon Transmission Time (TBTT) offset, short SSID, BSSID, and BSS parameters, which can aid in the discovery of the co-located 6 GHz BSS(s). A radio operating in the 2.4 GHz or 5 GHz band that receives a probe request frame, which includes an SSID or Short SSID matching the SSID of the co-located 6 GHz BSS, responds with a probe response frame that contains an RNR element that contains discovery information for the 6 GHz BSS. This enables STAs that are scanning in the 2.4 GHz or 5 GHz band to discover 6 GHz co-located APs from beacon or probe response frames transmitted by radios in the 2.4 GHz or 5 GHz band. Upon discovery of a 6 GHz AP, the STA can begin scanning for that particular 6 GHz AP. In response to a FILS discovery beacon 504*a*, the STA can send a probe request frame 506 to which the 6 GHz AP can respond with a probe response 508. As discussed above, use of FILS discovery beacons (504*a*-504*d*) allow for faster discovery of the AP.

As noted above, the WiFi 6 standard does not specify how mesh VAPs should be configured specifically on a 6 GHz radio. Yet, as also noted above, the concept of MBSSID is mandatory for operating in the 6 GHz band, and Wi-Fi 6E specifies new scanning mechanisms targeted for user devices, where STAs are not allowed to send broadcast probe requests to an AP operating on a channel in the 6 GHz band. This poses certain challenges to the discovery of mesh APs. It should be understood that mesh APs are APs that are configured (by a controller) to act as a mesh portal (an AP that uses its wired interface to reach an AP controller), or as a mesh point, an AP that establishes an all-wireless path to a mesh portal. Mesh APs locate and associated with the nearest neighbor, which typically provides the best path to the mesh portal. Mesh portals and mesh points can also be referred to as mesh nodes (used to generically refer to APs configured for mesh). A radio of a mesh AP can be shared between mesh backhaul traffic (acting as a backhaul link) and STA traffic, although an AP radio can be configured for mesh services only, or in the case of a multi-radio AP, a mesh AP can be configured to deliver client (STA) services on a first radio, and mesh services (or mesh and WLAN services) on another radio, etc.

It should be understood that the TBTT interval refers to a periodic transmission from an AP that announces the presence of the AP in the network. A beacon frame may be transmitted in a plurality of wireless communications protocols to enable synchronization of the AP with connected stations. As a non-limiting example, IEEE 802.11 LAN protocols include the TBTT period to allow STAs within a BSS to synchronize, providing information concerning the capabilities and configuration of the network. To limit air resource contention between devices in the communications network, the elapsed time of the service periods (SPs) of a given session should not be greater than the elapsed time of the TBTT period, i.e., the elapsed time in between beacon frames.

As discussed above, in an MBSSID beacon, a BSSID can be either a transmitted BSSID (in the case of the BSSID associated with the AP transmitting the MBSSID beacon), or a non-transmitted BSSID (in the case of VAPs on whose behalf the transmitted BSSID transmits the MBSSID beacon). In accordance with the WiFi 6 standard, a transmitted BSSID is sent out every TBTT, but a non-transmitted BSSID may not be transmitted at every TBTT. This is due of the size limitation of the MBSSID beacon. That is, if the MBSSID exceeds the size limit, as noted above, the MBSSID is split into smaller-sized MBSSID beacons. Although transmitted BSSIDs are transmitted at every TBTT, non-transmitted BSSIDs may not necessarily be sent out at every TBTT, resulting in non-transmitted BSSIDs being transmitted less frequently than the transmitted BSSID. This makes the non-transmitted BSSIDs less discoverable compared to transmitted BSSIDs when a large number of SSIDs are configured on a physical radio interface.

In the mesh context, connections between mesh APs and mesh STAs serve as the backhaul of the network. If the network conditions change, e.g., one mesh AP goes down, it would require the mesh STA to connect to a different mesh AP. To minimize or avoid data loss, the mesh STA should be able to scan and connect to another AP as quickly as possible.

Four mechanisms described herein facilitate faster discovery of a mesh AP. These four mechanisms can be used independently or in some combination thereof.

Figure 6A:
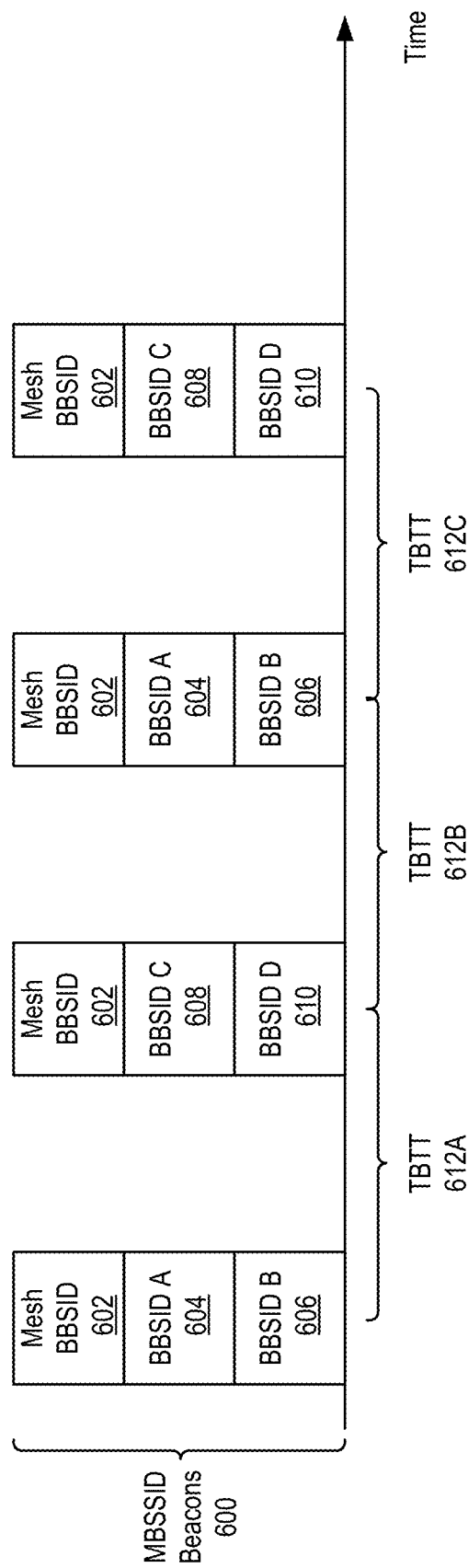
FIG. 6A illustrates an example multiple basic service set identifier (MBSSID) beaconing scenario in accordance with one embodiment.

In accordance with embodiment, on those APs that have mesh AP configured, the mesh VAP BSSID is made to be the transmitted BSSID. In this way, the mesh IE-related information is sent out as part of every MBSSID beacon transmitted. This would ensure the faster discovery of Mesh APs. FIG. 6A illustrates an example implementation of this embodiment. As illustrated in FIG. 6A, at every TBTT interval (612A-612C), an MBSSID beacon 600 is transmitted. In this example, consider that four AP BSSIDs are configured (BSSIDs A-D) along with a mesh BSSID. Every MBSSID beacon, as illustrated in FIG. 6A includes a transmitted BSSID, which, to facilitate a greater probability of mesh AP discovery, is set to be the mesh BSSID. However, BSSIDs A, B, C, and D are split amongst the MBSSID. In this example, BSSID A 604 and BSSID B 606 are transmitted every other MBSSID beacon, while BSSID C 608 and BSSID D 610 are are alternately transmitted every other MBSSID beacon. Because the mesh BSSID is the transmitted BSSID, it is transmitted at every MBSSID beacon, and mesh STAs can receive information regarding the capabilities of the mesh AP from each MBSSID beacon vis-à-vis merely by performing passive scanning. It should be understood that with passive scanning, a STA, in this case, a mesh STA can simply listen on a channel for the MBSSID beacon to obtain the requisite mesh AP information. With active scanning, the radio of the STA transmits a probe request, and listens from a probe response from an AP (as described above).

Figure 6B:
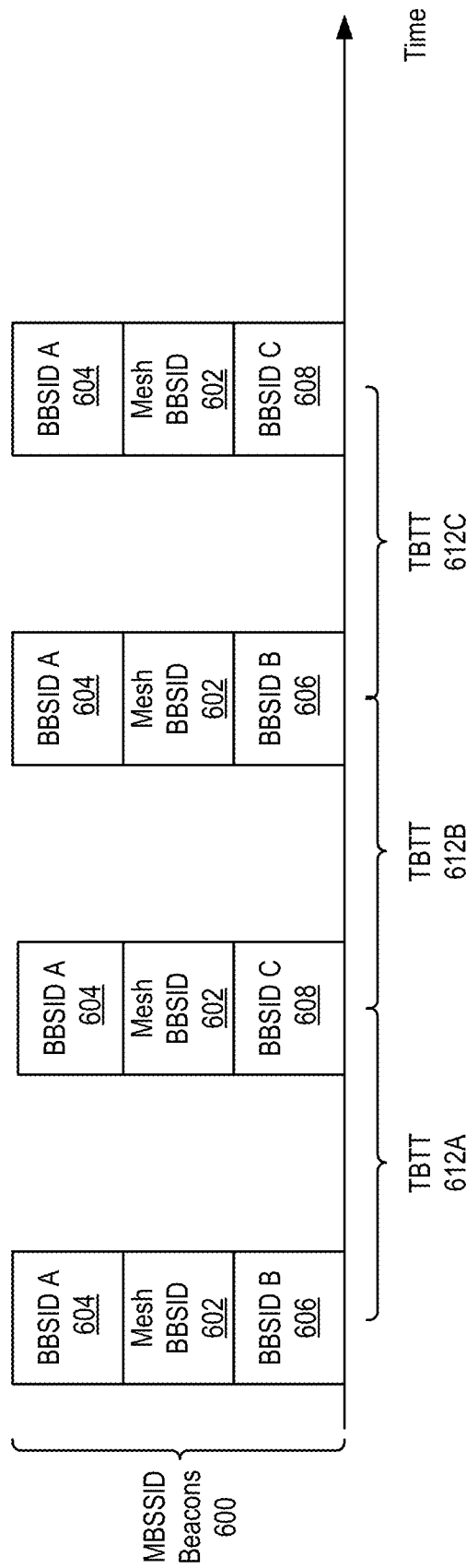
FIG. 6B illustrates an example MBSSID beaconing scenario in accordance with one embodiment.

In accordance with another embodiment, if a mesh VAP is configured on a particular AP, but that mesh VAP cannot be configured as the transmitted BSSID, that mesh VAP's BSSID will still be transmitted in full MBSSID beacons at every TBTT, but as a non-transmitted BSSID. For example, if a mesh VAP is not the first-created VAP of an AP, that VAP/BSSID will not be set as the transmitted BSSID. This mechanism is illustrated in FIG. 6B. In this embodiment, similar to the embodiment described above and illustrated in FIG. 6A, where three AP BSSIDs (BSSID A 604, BSSID B 606, and BSSID C 608) and a Mesh BSSID 602 are configured. BSSID A 604, in this example, may be configured to be the transmitted BSSID, and is transmitted at every TBTT (612A-612C). The mesh BSSID 602, BSSID B 606, and BSSID C 608 are non-transmitted BSSIDs. As described above, the transmitted BSSID corresponds to the BSSID that transmits its own and the other BSSIDs on the other VAPs' behalf. Even though the mesh VAP/BSSID is configured to be a non-transmitted BSSID, the AP nevertheless transmits it at every TBTT. In contrast, BSSID B 606 and BSSID C 608 are not transmitted at every TBTT. Mesh STAs can get all the information about the capability of the mesh VAP from any of MBSSID beacons 600 by doing a passive scan, again similar to the above-described embodiment.

It should be noted that the AP can decide to enable either mechanism automatically or based on a user-configured priority. For example, the AP can use the first mechanism where the backhaul link reconnection is more frequent compared to user roaming or backhaul link has a higher priority. The second mechanism is slightly less efficient because of the extra overhead due to the mesh BSSIDs being transmitted in every MBSSID beacon. This mechanism can be used where the backhaul reconnection is less likely and the faster user roaming is more important and/or frequent.

It should also be noted that in the event more than one mesh VAP/BSSID is configured on a single, physical AP (e.g., one VAP as a mesh portal, another VAP as a mesh point), both mesh VAPs/BSSID can be included in each full MBSSID beacon so long as the applicable beacon size limit is not exceeded. It should be understood that beacon size limits can be specified by chipset vendors, and can vary.

Figure 6C:
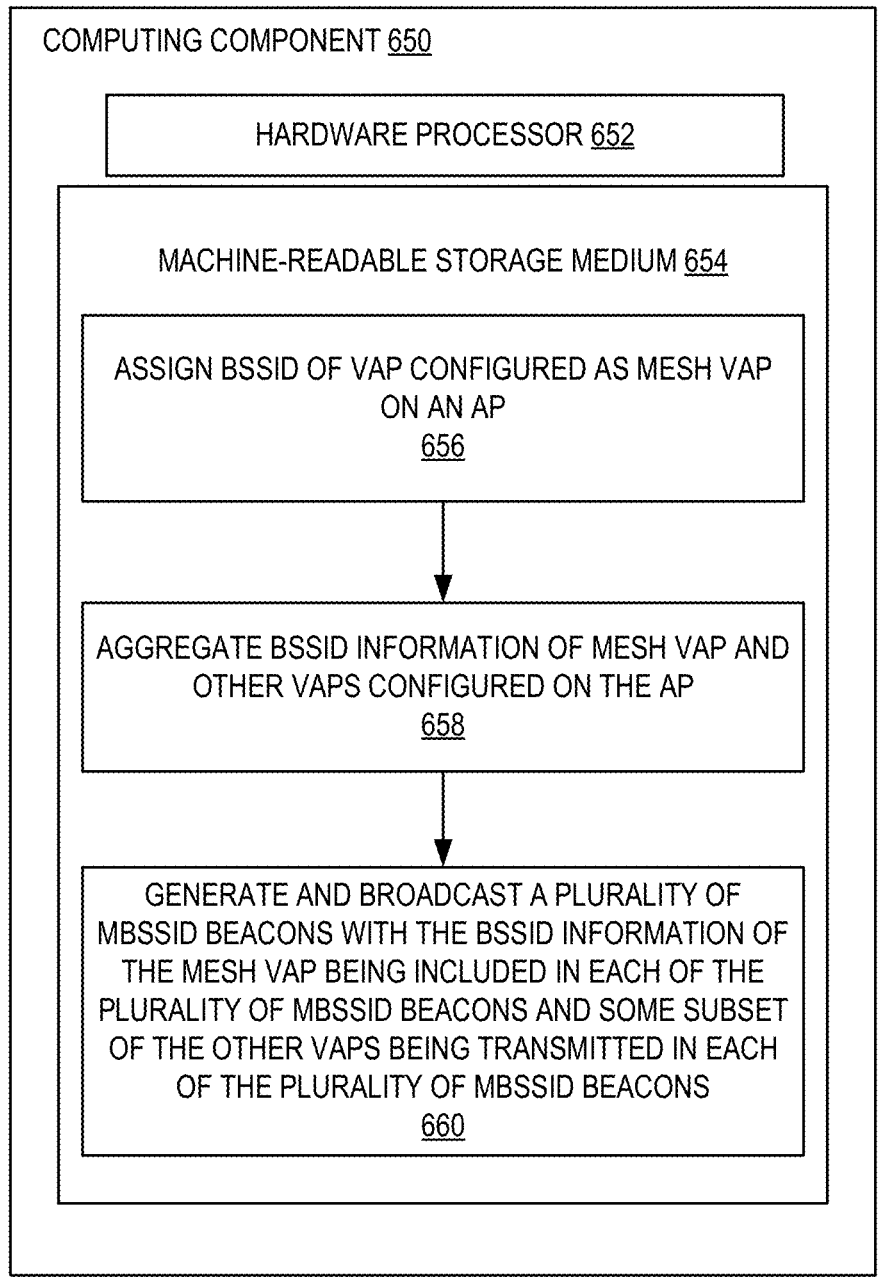
FIG. 6C illustrates an example computing component for discovery of a mesh AP in accordance with various embodiments.

FIG. 6C is a block diagram of an example computing component or device 650 for aggregating transmissions in accordance with one embodiment. Computing component 650 may be, for example, a server computer, a controller, or any other similar computing component capable of processing data. In the example implementation of FIG. 6C, computing component 650 includes a hardware processor, 652, and machine-readable storage medium, 654. In some embodiments, computing component 650 may be an embodiment of a component of wireless network 100, e.g., an AP such as AP 106A (FIG. 1A), for example.

Hardware processor 650 may be one or more central processing units (CPUs), semiconductor-based microprocessors, and/or other hardware devices suitable for retrieval and execution of instructions stored in machine-readable storage medium, 654. Hardware processor 652 may fetch, decode, and execute instructions, such as instructions 656-660 (and 670-674 (FIG. 7B), to control processes or operations for an AP. As an alternative or in addition to retrieving and executing instructions, hardware processor 652 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 654, may be any electronic, magnetic, optical, or other physical storage device that contains or stores executable instructions. Thus, machine-readable storage medium 654 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 654 may be a non-transitory storage medium, where the term "non-transitory" does not encompass transitory propagating signals. As described in detail below, machine-readable storage medium 654 may be encoded with executable instructions, for example, instructions 656-610 (and 670-674 (FIG. 7B).

As noted above, hardware processor 652 may control processes/operations for an AP. An AP as also noted above may be an AP configured to operate as/with multiple VAPs/BSSIDs. Hardware processor 652 may execute instruction 656 to assign the BSSID to a VAP configured as a mesh VAP on the AP.

Hardware processor 652 may execute instruction 658 to aggregate BSSID information of the mesh VAP and other VAPs configured on the AP. As discussed above, the Wi-Fi 6E specification mandates that MBSSID beaconing is to be performed, where the BSSID associated with the transmitting VAP is considered and broadcast as the transmitted BSSID, while the BSSIDs of the other configured VAPs are considered and broadcast as non-transmitted BSSIDs.

Hardware processor 652 may execute instruction 660 to generate and broadcast a plurality of MBSSID beacons with the BSSID information of the mesh VAP being included in each of the plurality of MBSSID beacons and some subset of the other VAPs being transmitted in each of the plurality of MBSSID beacons. As discussed above, certain limitations regarding MBSSID beacons may exist, and thus, an MBSSID beacon may need to be split up. The transmitted BSSID (reflecting the mesh VAP/BSSID) is transmitted in every MBSSID beacon, while the other VAPs may not necessarily be transmitted in every full MBSSID beacon. As also discussed above, in some embodiments, even if the mesh BSSID/VAP is not set to be the transmitted MBSSID in each MBSSID beacon, it may be nevertheless be transmitted as part of every MBSSID beacon. In this way, the mesh VAP/BSSID can be discovered more easily by mesh-capable STAs.

In accordance with another embodiment, the FILS discovery beacon/frame mechanism can be leveraged to better advertise mesh VAPs for discovery by mesh STAs. As discussed above, the 802.11 standard provides out-of-band mechanisms for faster discovery of APs through active scanning. However, before probing (e.g., sending probe requests), STAs must wait for approximately 20 ms. This waiting time is specified to allow an AP to send FILS discovery frames, which as described above, are periodically sent out every 20 ms. As discussed above, FILS discovery frames contain information in the form of RNR elements that aid in the discovery of a co-located 6 GHz BSS(s). Although RNR elements contains information such as channel number, operating class, TBTT Offset, Short SSID, BSSID, and BSS parameters, FILS beacons do not contain any information that can be used by mesh STAs to associate to a mesh VAP/BSSID.

Figure 7A:
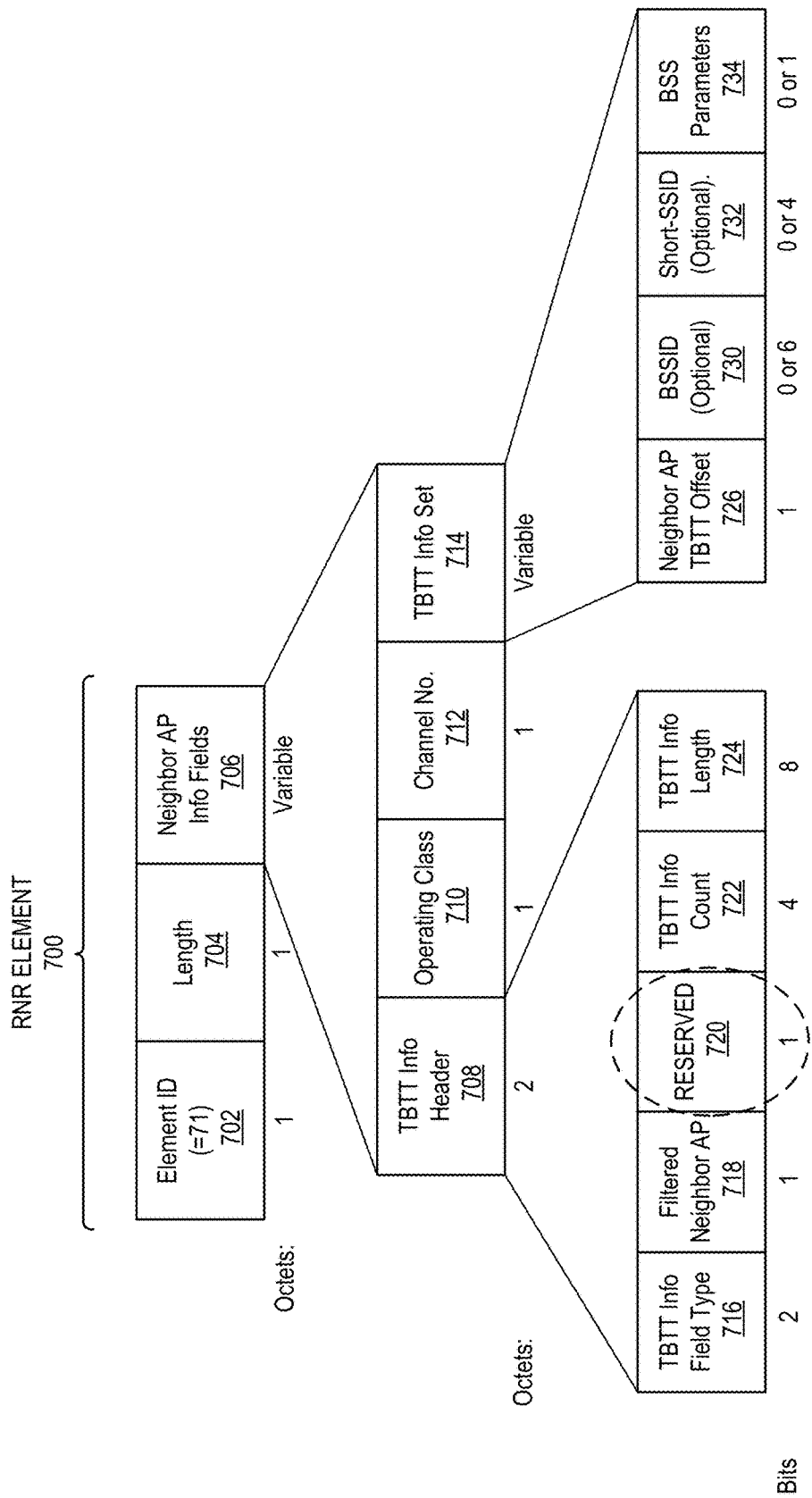
FIG. 7A illustrates example Reduced Neighbor Report (RNR) Element component parts leveraged for discovery of a mesh AP in accordance with one embodiment.
Figure 7B:
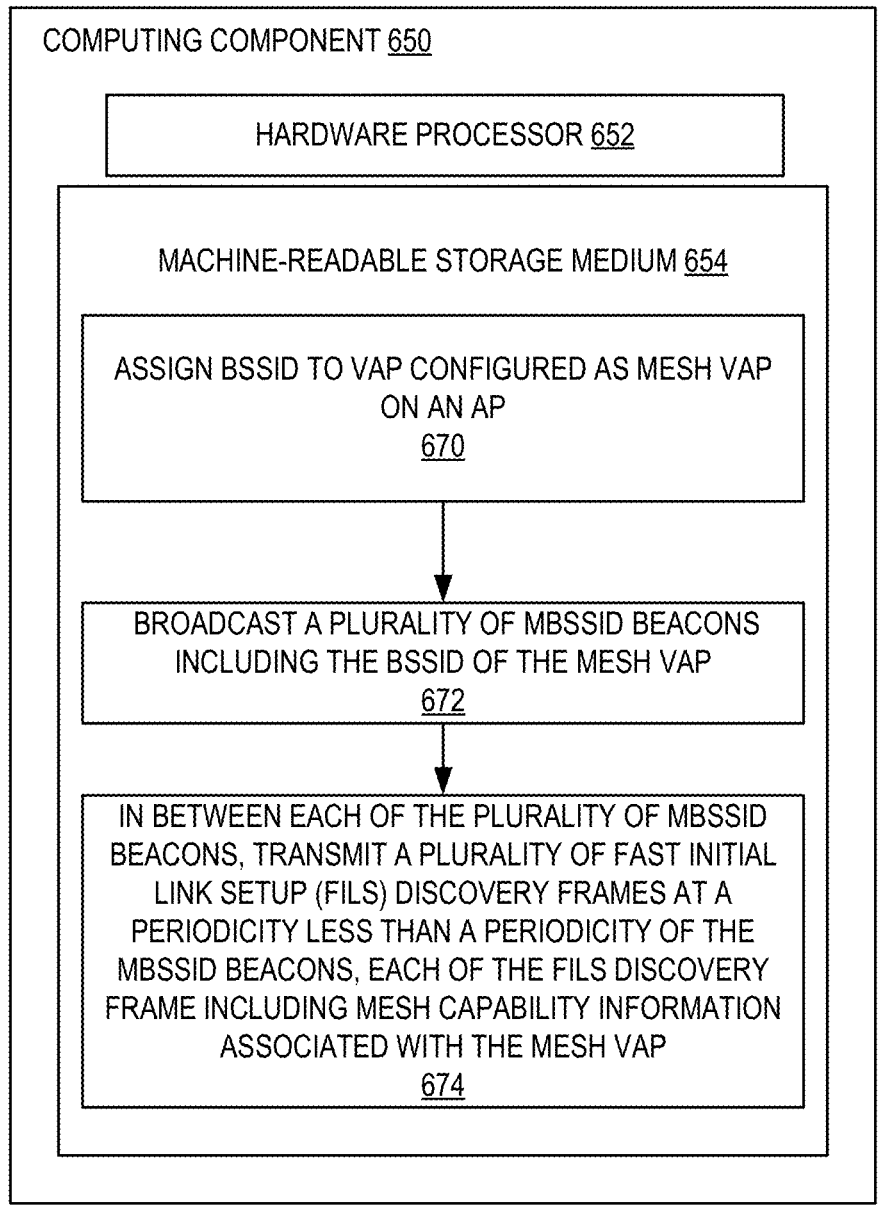
FIG. 7B illustrates an example computing component for discovery of a mesh AP in accordance with various embodiments.

FIG. 7A illustrates an RNR element 700, and its component parts/included information. RNR element 700 may comprise an element ID 702 (8 bits/1 octet), an indication of length of the RNR element 704 (8 bits/1 octet), and fields of information regarding neighbor APs 706 (the length of which can vary). Such neighbor AP information can comprise TBTT information header 708 (16 bits/2 octets), operative class 710 (8 bits/1 octet), channel number 712 (8 bits/1 octet), and TBTT information set 714 (variable length). TBTT information header 708 may itself comprise a TBTT information field type 716 (16 bits/2 octets), a filtered neighbor AP list 718, (8 bits/1 octet) a reserved field/octet 720, a TBTT information count field 722 (32 bits/4 octets), and a TBTT information length field 724 (64 bits/8 octets). TBTT information set field 714 may comprise a neighbor AP TBTT offset field 726 (8 bits/1 octet), BSSID 730 (0-48 bits/0-6 octets) (which is optional), short SSID 732 (0-32 bits/0-4 octets) (which is again optional), and BSS parameters field 734 (0-8 bits/0-1 octet).

In accordance with this embodiment, reserved field 720 can be used to convey information regarding the mesh VAP of an AP, e.g., one bit indicating non-mesh ("0") or mesh ("1"). Providing mesh VAP information negates a need for mesh STAs to probe those BSSIDs that do not contain mesh capabilities.

In some embodiments, rather than utilizing a reserved field, e.g., reversed field/octet 720, a proprietary or explicit mesh VAP information field can be used to indicate the presence of a mesh VAP. For example, a vendor-specific IE of the transmitted BSSID beacon can be used. The scanning mesh VAP STA can decide to stay or skip the channel based on this information. In this way, the mesh STA can improve its scanning time. This mechanism can be complementary to the aforementioned mechanism, where the reserved field/octet 720 of the RNR element of a FILS discovery beacon is used. That is, an AP may advertise the presence of a mesh VAP using a dedicated mesh VAP information field of the transmitted BSSID beacon, but if that full beacon is missed, a mesh STA can discover the mesh VAP via a FILS discovery beacon by waiting approximately 20 ms (for the FILS discovery beacon to be sent) vs waiting an entire 100 ms for another full beacon.

Various embodiments, when used, allow for faster mesh roaming times, reduced latency for connected STAs. The value of mesh networks appears to be growing given the desire for more and more users to work remotely/from home. APs that support mesh over 6E/mesh backhaul can provide such mesh-based advantages.

FIG. 7B is a block diagram of example computing component or device 650 for providing mesh VAP information in beacons for faster discovery by mesh STAs in accordance with various embodiments. As described above, computing component 650 may be, for example, a server computer, a controller, or any other similar computing component capable of processing data. Like FIG. 6C, computing component 650 includes a hardware processor, 652, and machine-readable storage medium, 654.

Hardware processor 652 may execute instruction 670 to assign a BSSID to a VAP configured as a mesh VAP on an AP similar to instruction 656. It should be noted that in some embodiments, as noted above, the various disclosed mechanisms can be used in conjunction with one another. Accordingly, the AP may already know (via use of another mechanism) which BSSID corresponds to the mesh BSSID.

Hardware processor 652 may execute instruction 672 to broadcast a plurality of MBSSID beacons including the BSSID of the mesh VAP. A particular, dedicated field/octet (s) can be used to carry this information for discovery by mesh STAs attempting to discover mesh VAPs.

Hardware processor 652 may execute instruction 674 to, in between each of the plurality of MBSSID beacons, transmit a plurality of FILS discovery beacons at a periodicity less than a periodicity of the transmission of MBSSID beacons, each of the FILS discovery beacons including mesh information associated with the mesh VAP. As described above, the reserved field/octet of an RNR element can be used to hold mesh VAP information that a mesh capable STA can detect/decode to understand what BSSID to probe via a FILS discovery beacon.

Figure 8:
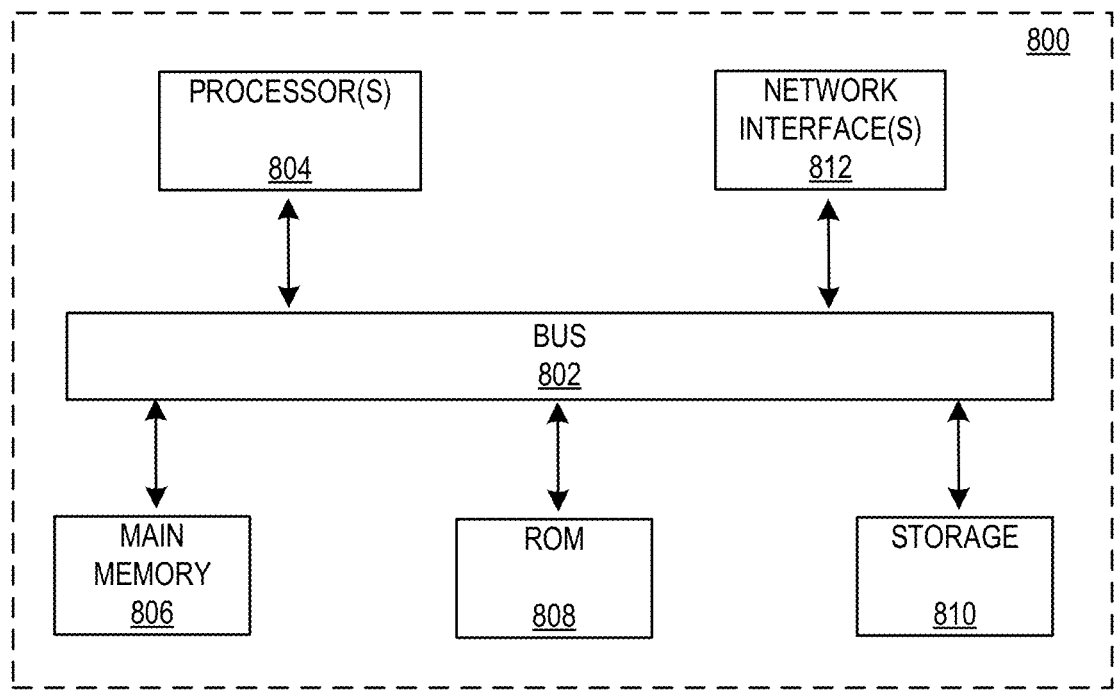
FIG. 8 illustrates an example computing component in which various embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 300 may further include at least one network interface 812, such as a network interface controller (NIC), network adapter, or the like, or a combination thereof, coupled to bus 802 for connecting computer system 800 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP), comprising:
    a processor; and
    a memory operatively connected to the processor, and including computer code that when executed, causes the processor to:
        assign a basic service set identifier (BSSID) to a virtual AP (VAP) configured as a mesh VAP on the AP;
        aggregate BSSID information of the mesh VAP and other VAPs configured on the AP; and
        generate and broadcast a plurality of multiple BSSID (MBSSID) beacons with the BSSID information of the mesh VAP being included in each of the plurality of MBSSID beacons and some subset of the other VAPs being transmitted in each of the plurality of MBSSID beacons.

2. The AP of claim 1, wherein the BSSID information of the mesh VAP comprises transmitted BSSID information.

3. The AP of claim 2, wherein the BSSID information of the other VAPs comprises non-transmitted BSSID information.

4. The AP of claim 1, wherein a size of each of the plurality of MBSSID beacons complies with a specified size limitation.

5. The AP of claim 1, wherein the BSSID information of the mesh VAP comprises non-transmitted BSSID information.

6. The AP of claim 5, wherein the BSSID information of one of the other VAPs comprises transmitted BSSID information.

7. The AP of claim 1, wherein each of the plurality of MBSSID beacons is broadcast in accordance with a periodic Target Beacon Transmission Time (TBTT) interval.

8. The AP of claim 1, wherein transmission of MBSSID beacons including the BSSID information of the mesh VAP as transmitted BSSID information or as non-transmitted BSSID information is based on backhaul link reconnection frequency.

* * * * *